United States Patent
Lee (10) Patent No.: US 9,519,149 B2
(45) Date of Patent: Dec. 13, 2016

(54) HEAD-UP DISPLAY SYSTEM, AND METHOD AND APPARATUS FOR CONTROLLING THE SAME

(71) Applicant: Samsung Display Co., Ltd., Yongin, Gyeonggi-Do (KR)

(72) Inventor: Sung-Won Lee, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 179 days.

(21) Appl. No.: 14/173,691

(22) Filed: Feb. 5, 2014

(65) Prior Publication Data
US 2014/0333647 A1    Nov. 13, 2014

(30) Foreign Application Priority Data

May 13, 2013 (KR) .......................... 10-2013-0054009

(51) Int. Cl.
*G02B 27/01* (2006.01)
*G06F 3/147* (2006.01)

(52) U.S. Cl.
CPC ........... *G02B 27/0179* (2013.01); *G06F 3/147* (2013.01); *G09G 2320/0626* (2013.01); *G09G 2340/0492* (2013.01); *G09G 2356/00* (2013.01); *G09G 2360/144* (2013.01); *G09G 2380/10* (2013.01)

(58) Field of Classification Search
CPC .................................................. G02B 27/0179
See application file for complete search history.

(56) References Cited

U.S. PATENT DOCUMENTS

| | | | |
|---|---|---|---|
| 4,973,132 A | | 11/1990 | McDonald et al. |
| 5,497,271 A | * | 3/1996 | Mulvanny .............. B60K 37/02 345/7 |
| 5,510,983 A | * | 4/1996 | Iino .......................... G01P 1/08 340/441 |
| 5,963,280 A | * | 10/1999 | Okuda .................. G01C 21/365 349/64 |
| 6,262,848 B1 | * | 7/2001 | Anderson .......... G02B 27/0101 359/630 |
| 6,481,851 B1 | * | 11/2002 | McNelley .......... G02B 27/2292 345/5 |
| 6,720,938 B2 | * | 4/2004 | Ohkawara ................ G09G 5/00 345/7 |

(Continued)

FOREIGN PATENT DOCUMENTS

| JP | 05-038967 A | 2/1993 |
|---|---|---|
| JP | 05-026588 U | 4/1993 |

(Continued)

*Primary Examiner* — Jacinta M Crawford
*Assistant Examiner* — Phong Nguyen
(74) *Attorney, Agent, or Firm* — Knobbe, Martens, Olson & Bear, LLP (57) ABSTRACT

Systems, methods and an apparatus for controlling a head-up display system are disclosed. One inventive aspect includes a transparent display positioned between a driver's seat and a vehicle windshield, a display mode setting unit and an image adjustment unit. The display mode setting unit is configured to set a display mode of the transparent display based on an angle between the transparent display and a vehicle body. The image adjust unit is configured to adjust an image displayed on the transparent display according to the display mode.

26 Claims, 5 Drawing Sheets

(56) References Cited

U.S. PATENT DOCUMENTS

| | | | |
|---|---|---|---|
| 6,731,435 B1* | 5/2004 | Kormos | G02B 26/0816 345/7 |
| 6,750,832 B1* | 6/2004 | Kleinschmidt | B60K 35/00 345/7 |
| 6,864,927 B1* | 3/2005 | Cathey | G02B 27/01 349/11 |
| 7,158,095 B2* | 1/2007 | Jenson et al. | 345/7 |
| 7,224,325 B2* | 5/2007 | Nagano | G02B 27/0101 345/7 |
| 7,982,959 B1 | 7/2011 | Lvovskiy et al. | |
| 8,730,128 B2* | 5/2014 | Helot | G02B 27/01 345/1.3 |
| 8,743,296 B2* | 6/2014 | Ishida | B60K 35/00 345/7 |
| 2002/0196201 A1* | 12/2002 | Rosen | B60K 35/00 345/7 |
| 2003/0160736 A1* | 8/2003 | Faso et al. | 345/8 |
| 2004/0118987 A1* | 6/2004 | Matko | B60R 11/0235 248/282.1 |
| 2005/0162376 A1* | 7/2005 | Sunoue et al. | 345/104 |
| 2007/0085815 A1* | 4/2007 | Oesterling | G09G 3/3648 345/102 |
| 2007/0114354 A1* | 5/2007 | Jeon | G06F 1/1601 248/371 |
| 2008/0285138 A1* | 11/2008 | Lebreton | G02B 27/0149 359/630 |
| 2009/0067058 A1* | 3/2009 | Ishii | G02B 27/01 359/630 |
| 2009/0086329 A1* | 4/2009 | Potakowskyj | G02B 27/0149 359/630 |
| 2009/0237572 A1* | 9/2009 | Kishimoto | G02F 1/13318 348/734 |
| 2010/0253601 A1 | 10/2010 | Seder et al. | |
| 2011/0102483 A1* | 5/2011 | Kanamori | G09G 3/002 345/690 |
| 2011/0192551 A1* | 8/2011 | Rance | E06B 9/264 160/127 |
| 2011/0267701 A1 | 11/2011 | Moussa et al. | |
| 2012/0019493 A1* | 1/2012 | Barnhoefer | H05B 33/0851 345/207 |
| 2012/0105424 A1* | 5/2012 | Lee et al. | G09F 9/35 345/212 |
| 2012/0154441 A1* | 6/2012 | Kim | G06K 9/00832 345/633 |
| 2012/0188651 A1* | 7/2012 | Lin | G02B 27/01 359/630 |
| 2013/0100533 A1* | 4/2013 | Potakowskyj | G02B 27/0149 359/630 |
| 2013/0300911 A1* | 11/2013 | Beckman | 348/335 |
| 2014/0203166 A1* | 7/2014 | Betz | F21S 11/007 250/201.1 |

FOREIGN PATENT DOCUMENTS

| | | | | |
|---|---|---|---|---|
| JP | 08-160882 | * | 6/1996 | G09F 9/30 |
| JP | 2008-209724 A | | 9/2008 | |
| KR | 1993-0006447 B1 | | 7/1993 | |
| KR | 10-2012-0067854 A | | 6/2012 | |

* cited by examiner

HEAD-UP DISPLAY SYSTEM, AND METHOD AND APPARATUS FOR CONTROLLING THE SAME

CROSS-REFERENCE TO RELATED APPLICATIONS

This application claims the benefit of Korean Patent Application No. 10-2013-0054009, filed on May 13, 2013, in the Korean Intellectual Property Office, the disclosure of which is incorporated herein in its entirety by reference.

BACKGROUND

Field

The disclosed technology generally relates to a head-up display (HUD) system, and a method and an apparatus for controlling the head-up display system according to various situations.

Description of the Related Technology

Head-up displays (HUD) have been studied and developed to effectively provide information to first military pilots, where they have wide usage, and now motor vehicle drivers. HUDs are capable of providing information, which includes driving speed, fuel efficiency, engine status and navigation information, for example.

When a transparent display is used in the HUD, the driver looks through a windshield and the information is simultaneously provided within the same viewable area to the driver. As such, an augmented reality is realized by displaying the information so that it overlaps with the actual road view in front of the driver.

However, transmittance of a transparent display in front of the driver is problematic and limited because of concerns about obscuring the view ahead. Also because the transparent display allows ambient light to pass through the information display, visibility of an image shown on the transparent display can be reduced.

SUMMARY OF CERTAIN INVENTIVE ASPECTS

The disclosed technology provides a display system providing various display modes, and a method and an apparatus for controlling the same. Technical tasks to be accomplished by embodiments are not limited to those described above and other technical tasks may be inferred from the following embodiments.

According to an aspect of the disclosed technology, there is provided a head-up display system for a vehicle, the display system including a transparent display positioned between a driver's seat and a vehicle windshield, a display mode setting unit configured to set a display mode of the transparent display as a first mode or a second mode at least partially based on an angle between the transparent display and a vehicle body, and an image adjustment unit configured to adjust an image displayed on the transparent display according to the display mode.

In another exemplary implementation of the head-up display system, the image adjustment unit inverts the image when the display mode of the transparent display is the second mode.

In another exemplary implementation of the head-up display system, the display mode setting unit sets the display mode as the first mode when the angle is equal to or greater than a predetermined angle, and wherein the display mode setting unit sets the display mode as the second mode when the angle is less than the predetermined angle.

In another exemplary implementation of the head-up display system, the head-up display system further comprises a hinge unit connected to the vehicle body and supporting at least one side of the transparent display.

In another exemplary implementation of the head-up display system, the hinge unit includes an electric motor configured to rotate the transparent display with the at least one side of the transparent display as a rotation axis.

In another exemplary implementation of the head-up display system, the display system further includes at least one sensor located inside or outside of the vehicle and configured to measure a luminance, and a hinge controller configured to control the electric motor at least partially based on the measured amount of the light.

In another exemplary implementation of the head-up display system, the hinge controller controls the electric motor to adjust the angle between the vehicle body and the transparent display to be a first angle when the amount of the light is equal to or greater than a predetermined_value. The hinge controller controls the electric motor to adjust the angle to be a second angle when the luminance is less than the predetermined value, and wherein the second angle is different than the first angle. In another exemplary implementation of the head-up display system, the second angle is smaller than the first angle.

In another exemplary implementation of the head-up display system, the image displayed on the transparent display is directed toward the driver's seat the display mode is the first mode, and wherein the image is directed toward the driver's seat as a reflection on the windshield when the display mode is the second mode.

In another exemplary implementation of the head-up display system, the display mode setting unit may set the display mode as the first mode when the angle is the first angle, and as the second mode when the angle is the second angle.

In another exemplary implementation of the head-up display system, the sensor includes an external sensor that measures an amount of external light outside the vehicle and an internal sensor that measures an amount of internal light inside the vehicle, and wherein the hinge controller controls the electric motor at least partially based on the amount of external light and the amount of internal light.

In another exemplary implementation of the head-up display system, the hinge controller controls the angle between the vehicle body and the transparent display to be the first angle when the amount of the external light is greater than the amount of the internal light. The hinge controller controls the angle to be the second angle when the external light amount is less than the internal light amount. The second angle is different than the first angle.

In another exemplary implementation of the head-up display system, the second angle is smaller than the first angle.

In another exemplary implementation of the head-up display system, the transparent display is detachable from the hinge unit.

In another exemplary implementation of the head-up display system, the transparent display is an organic electroluminescence display.

In another exemplary implementation of the head-up display system, a reflection plate is located on the vehicle windshield. The reflection plate is configured to reflect the image displayed on the transparent display.

In another exemplary implementation of the head-up display system, at least one sensor is located inside or outside the vehicle. The at least one sensor is configured to measure a luminance. The image adjustment unit controls a brightness of the image displayed on the transparent display at least partially based on the amount of the light measured by the at least one sensor.

According to another aspect of the disclosed technology, there is provided an apparatus for controlling a head-up display of a vehicle, the apparatus including a display mode setting unit configured to set a display mode of a transparent display as a first mode or a second mode at least partially based on an angle between the transparent display and a vehicle body, and an image adjustment unit configured to invert an image displayed on the transparent display when the display mode of the transparent display is the second mode. The transparent display is located between a driver's seat and a vehicle windshield and is connected to the vehicle body via a hinge unit.

In another exemplary implementation of the apparatus, the hinge unit further includes an electric motor configured to rotate the transparent display with one side of the transparent display as a rotation axis, and a hinge controller configured to control the electric motor at least partially based on the luminance measured by at least one sensor located inside or outside the vehicle.

In another exemplary implementation of the apparatus, the at least one sensor includes an external sensor that measures an amount of external light outside the vehicle and an internal sensor that measures an amount of internal light inside the vehicle. The hinge controller controls the electric motor at partially based on the amount of the external light and the amount of the internal light.

In another exemplary implementation of the apparatus, the hinge controller controls the angle between the vehicle body and the transparent display to be a first angle when the amount of the external light is greater than the amount of the internal light. The hinge controller controls the angle to be a second angle when the amount of the external light is less than the amount of the internal. The second angle is smaller than the first angle.

In another exemplary implementation of the apparatus, the image displayed on the transparent display is directed toward the driver's seat when the display mode is the first mode and the image is directed toward the driver's seat as a reflection on the windshield when the display mode is the second mode.

According to another aspect of the disclosed technology, there is provided a method of controlling a head-up display of a vehicle, the method includes setting a display mode of a transparent display interposed between a driver's seat and a vehicle windshield as a first mode or a second mode at least partially based on an angle between the transparent display and a vehicle body, and adjusting an image displayed on the transparent display. The transparent display is connected to a vehicle body by a hinge unit that supports one side of the transparent display.

In another exemplary implementation of the method, adjusting the image comprises inverting the image when the display mode of the transparent display is the second mode.

In another exemplary implementation of the method, the method comprises controlling an electric motor of the hinge unit at least partially based on a luminance measured by at least one sensor located inside or outside the vehicle. The electric motor is configured to rotate the transparent display with one side of the transparent display as a rotation axis. In another exemplary implementation of the method, controlling of the electric motor comprises controlling the electric motor at least partially based on an amount of external light and an amount of internal light. The at least one sensor comprises an external sensor that measures the amount of the external light outside the vehicle and an internal sensor that measures the amount of the internal light inside the vehicle.

In another exemplary implementation of the method, controlling the electric motor comprises controlling the electric motor so that the angle between the vehicle body and the transparent display is a first angle when the amount of the external light is greater than the amount of the internal light and so that the angle is a second angle when the amount of the external light is less than the amount of the internal light. The second angle is smaller than the first angle.

According to another aspect of the disclosed technology, there is provided an apparatus for controlling a head-up display of a vehicle. The apparatus comprises means for transparently displaying an image located between a driver's seat and a vehicle windshield, means for setting a display mode of the means for transparently displaying the image as a first mode or a second mode at least partially based on an angle between a vehicle body and the means for transparently displaying the image and means for adjusting the image displayed on the means for transparently displaying the image according to the display mode.

In another exemplary implementation of the apparatus, the means for adjusting the image further comprises means for inverting the image when the display is the second mode.

In another exemplary implementation of the apparatus, the apparatus further comprises means for measuring a luminance inside or outside the vehicle, means for connecting at least one side of the means for transparently displaying the image to a vehicle body of the vehicle, and means for controlling an electric motor of the means for connecting at least partially based on the measured amount of the light, wherein the electric motor is configured to rotate the means for transparently displaying the image with the at least one side of the means for transparently displaying the image as a rotation axis.

BRIEF DESCRIPTION OF THE DRAWINGS

The above and other features and advantages of the disclosed technology will become more apparent by describing in detail exemplary embodiments thereof with reference to the attached drawings in which.

DETAILED DESCRIPTION OF CERTAIN INVENTIVE EMBODIMENTS

Hereinafter, certain exemplary embodiments according to the disclosed technology will be described with reference to the accompanying drawings, in which exemplary embodiments of the disclosed technology are shown. As those skilled in the art would realize, the described embodiments may be modified in various different ways, all without departing from the spirit or scope of the disclosed technology.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the disclosed technology is not limited to the illustrated sizes and thicknesses.

In the drawings, the thickness of layers, films, panels, regions, etc., are exaggerated for clarity. In the drawings, for better understanding and ease of description, the thicknesses of some layers and areas are exaggerated. It will be understood that when an element such as a layer, film, region, or substrate is referred to as being "on" another element, it may be directly on the other element or intervening elements may also be present.

Expressions such as "at least one of," when preceding a list of elements, modify the entire list of elements and do not modify the individual elements of the list.

Since the disclosed technology may be modified in various ways and has several embodiments, particular embodiments will be illustrated in the drawings and described in the detailed description in detail. However, it is not intended to limit the disclosed technology to particular embodiments but it should be understood that the disclosed technology covers all modifications, equivalents, and replacements that fall within the scope and technology of the disclosed technology. Detailed descriptions related to well-known functions or configurations will be omitted if it is determined that they may unnecessarily obscure subject matters of the disclosed technology when describing the disclosed technology.

While the terms first, second, and the like may be used for explaining various components, components should not be limited by such terms. The terms are used only for the purpose of distinguishing one component from another.

The terms used herein are used just to describe specific embodiments and are not intended to limit the disclosed technology. The terms of a singular form may include plural forms unless being used having an explicitly different meaning in the context. It should be understood that the terms such as "comprises", "includes", or "has" are herein intended to designate that there is a feature, a numeral, a step, an operation, a component, a part or their combination described in the specification and do not exclude one or more other features, numerals, steps, operations, components, parts or their combinations.

Here, when a first element is described as being coupled to a second element, the first element may be not only directly coupled to the second element but may also be indirectly coupled to the second element via a third element. Further, some of the elements that are not essential to the complete understanding of the disclosed technology are omitted for clarity. Also, like reference numerals refer to like elements throughout.

The disclosed technology will be described below in more detail with reference to exemplary embodiments of the disclosed technology that are shown in the accompanying drawings.

Figure 1:
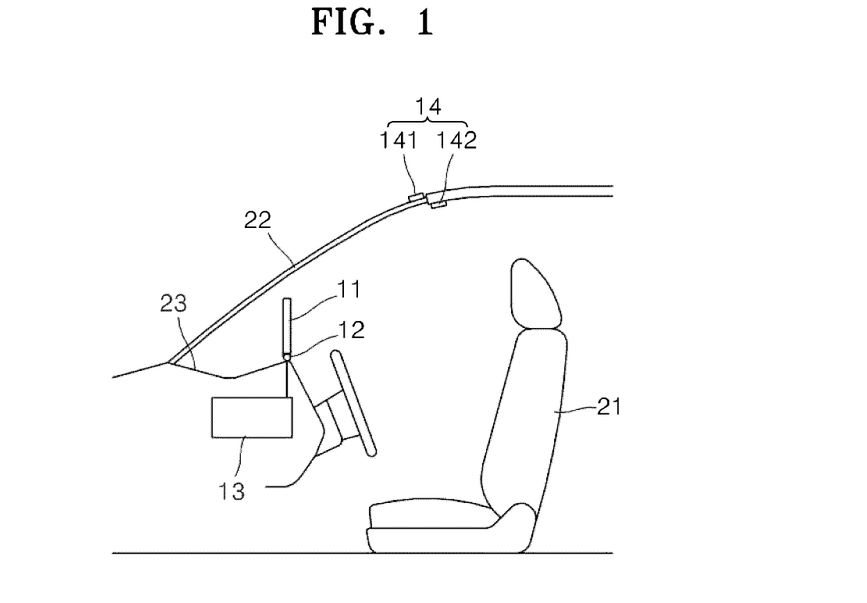
FIG. 1 is a view schematically illustrating a head-up display system according to an embodiment of the disclosed technology.

FIG. 1 is a view schematically illustrating a head-up display system according to an embodiment of the disclosed technology. Referring to FIG. 1, the head-up display system includes a transparent display 11, a hinge unit 12, and a control unit 13. The transparent display 11 is interposed or positioned between a driver's seat 21 and a vehicle windshield 22. The hinge unit 12 is connected to a vehicle body 23 and supports one side of the transparent display 11. The control unit 13 is connected to the transparent display 11 and the hinge unit 12 and controls the head-up display system According to an embodiment of the disclosed technology, the head-up display system shown in FIG. 1 may include a sensor 14 that is disposed at an outside or inside of a vehicle and measures a luminance. The sensor 14 may include an external sensor 141 that measures a luminance outside of a vehicle and an internal sensor 142 that measures a luminance inside a vehicle.

In FIG. 1, positions of the external sensor 141 and the internal sensor 142 are illustrated in one embodiment for convenience of description, but the positions of the external sensor 141 and the internal sensor 142 are not limited thereto. The positions of the external sensor 141 and the internal sensor 142 may be any position where a luminance inside or outside a vehicle is measured.

In FIG. 1, the hinge unit 12 is illustrated as being connected onto a dashboard, which is interposed between the driver's seat 21 and the vehicle windshield 22 for convenience of description, but a method of connecting the hinge unit 22 to the vehicle body 23 is not limited thereto. The hinge unit 12 may be connected to a vehicle ceiling or may be disposed at any location where the hinge unit 12 may be connected to the vehicle body 23 and support the transparent display 11. According to an embodiment of the disclosed technology, the transparent display 11 may be detached from the hinge unit 12.

Also, in FIG. 1, the control unit 13 is illustrated as positioned under the dashboard of the vehicle for convenience of description, but a position of the control unit 13 is not limited thereto. The control unit 13 may be disposed at any position where the control unit 13 may be electrically connected to the transparent display 11, the hinge unit 12, and the sensor 14.

Although not shown in FIG. 1, the windshield 22 of FIG. 1 may include a reflection plate that reflects an image displayed on the transparent display 11. In an exemplary implementation, the reflection plate is formed of a material that makes a mirror-like surface of the windshield 22, but the material of the reflection plate is not limited thereto.

According to an embodiment of the disclosed technology, the transparent display 11 of FIG. 1 may be an organic electroluminescence display. Also, the transparent display 11 may be a liquid crystal display (LCD), but a type of the transparent display 11 is not limited thereto.

According to an embodiment of the disclosed technology, the head-up display system of FIG. 1 may provide two display modes.

In a first mode, the transparent display 11 is stood up and displays an image toward the driver's seat 21 to provide the image directly to a driver. Since the transparent display 11 allows ambient light to pass therethrough, the light entering through the windshield 22 may pass through the transparent display 11 and reach the driver even when the transparent display 11 is stood up. Accordingly, the light entering through the windshield 22 and the image displayed on the transparent display 11 may reach the driver.

In a second mode, the transparent display 11 is laid down and displays an image toward the windshield 22, and thus an image reflected on the windshield 22 may be provided to the driver. Accordingly, light entering through the windshield 22 and an image displayed on the transparent display 11 reflected on the windshield 22 may reach the driver.

The transparent display 11 may change or maintain its state of being stood up and being laid down by the hinge unit 12. Hereinafter, a control method of the display system and a structure of the control unit 13 for the controlling method will be described by referring to the drawings.

Figure 2:
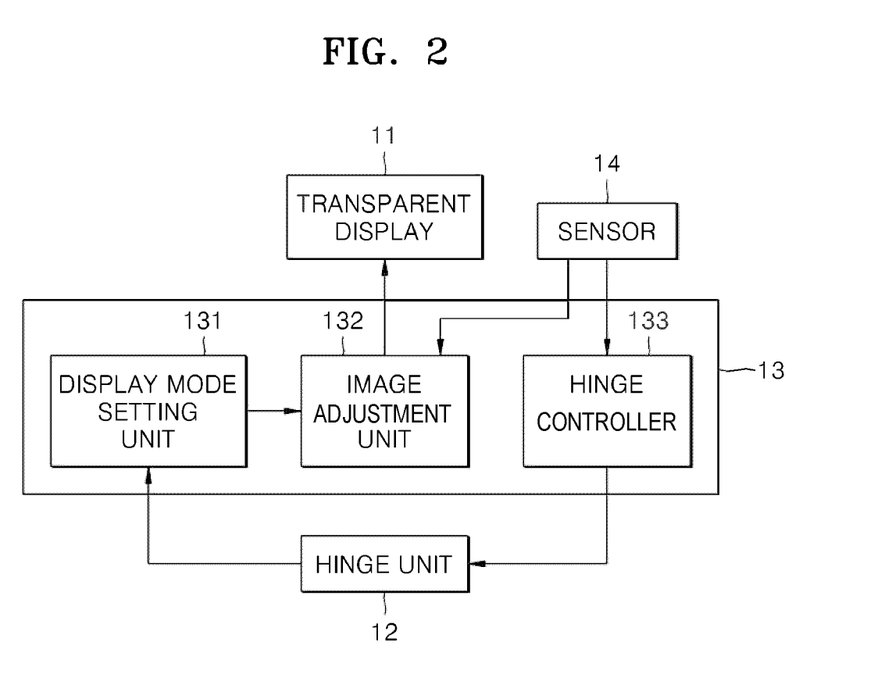
FIG. 2 is a block diagram schematically illustrating the structure of the control unit of FIG. 1.

FIG. 2 is a block diagram schematically illustrating the structure of the control unit 13 of FIG. 1. Referring to FIG. 2, the control unit 13 may include a display mode setting unit 131, an image adjustment unit 132, and a hinge controller 133.

The display mode setting unit 131 may set a display mode of the transparent display 11 as the first mode or the second mode depending on an angle at which the transparent display 11 is stood up. The display mode setting unit 131 may recognize the angle at which the transparent display 11 is stood up by the hinge unit 12. However, a method for the display mode setting unit 131 to recognize the angle at which the transparent display 11 is stood up is not limited thereto.

In one implementation, when a standing angle of the transparent display 11 is equal to or greater than a predetermined angle, the display mode setting unit 131 set a display mode of the transparent display 11 as the first mode. When a standing angle of the transparent display 11 is less than the predetermined angle, the display mode setting unit 131 may set a display mode of the transparent display 11 as the second mode. Referring to FIG. 1, a standing angle of the transparent display 11 may be measured from the vehicle body 23 to which the transparent display 11 is connected or from the ground surface, but a surface from which a standing angle of the transparent display 11 may be measured is not limited thereto as long as the angle may determine whether the transparent display 11 is stood up or laid down.

Figure 3A:
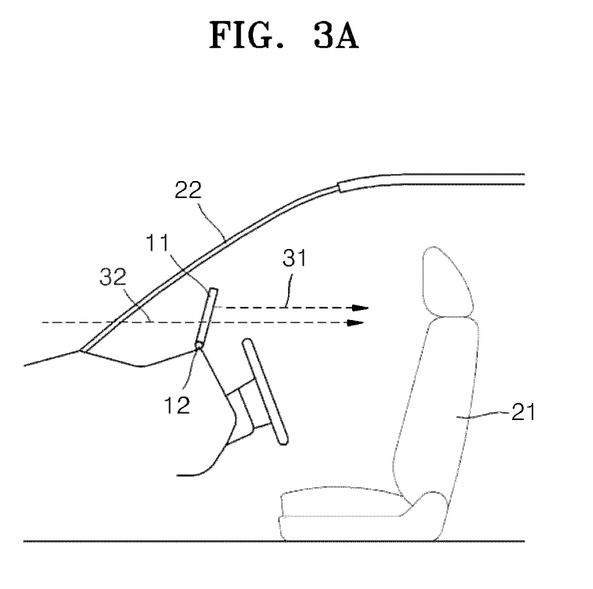
FIG. 3A is a view schematically illustrating a display system set as the first mode by the display mode setting unit.

FIG. 3A is a view schematically illustrating a display system set as the first mode by the display mode setting unit 131. Referring to FIG. 3A, when a display mode of the transparent display 11 is the first mode, an image displayed on the transparent display 11 may reach the driver's seat 21 along a pathway 31, and light entering through the windshield 22 may reach the driver's seat 21 along a pathway 32 passing through the transparent display 11.

Figure 3B:
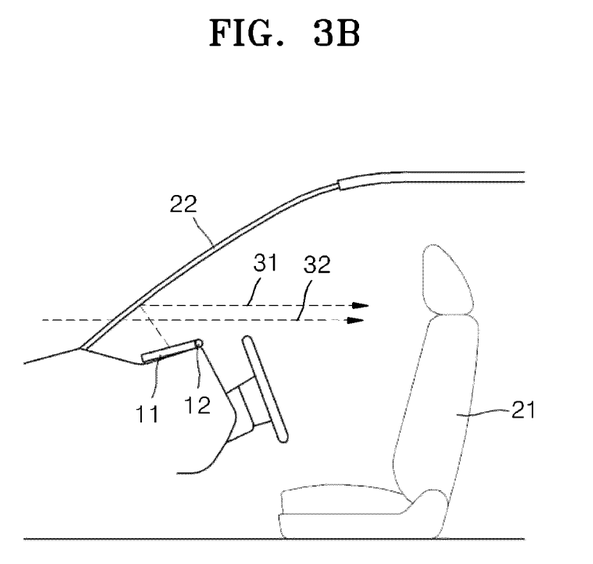
FIG. 3B is a view schematically illustrating a display system set as the second mode by the display mode setting unit.

FIG. 3B is a view schematically illustrating a display system set as the second mode by the display mode setting unit 131. Referring to FIG. 3B, when a display mode of the transparent display 11 is the second mode, an image displayed on the transparent display 11 may be reflected on the windshield 22 and reach the driver's seat 21 along the pathway 31, and light entering through the windshield 22 may reach the driver's seat 21 along the pathway 32.

According to an embodiment of the disclosed technology, a user of the display system may manually control an angle of the transparent display 11. In one exemplary implementation, when an image reflected on the windshield 22 from the transparent display 11 is determined as not being clearly visible since a periphery of the image is bright, the user stands the transparent display 11 up as shown in FIG. 3A.

When an angle at which the transparent display 11 is stood up by the user is equal to or greater than a predetermined angle, the display mode setting unit 131 may set a display mode of the transparent display 11 as the first mode. When the angle of the transparent display 11 is a first angle which is predetermined, the display mode setting unit 131 may set the display mode as the first mode. Here, the first angle may be an angle between the vehicle body 23 and the transparent display 11 when the transparent display is stood up as shown in FIG. 3A.

In this regard, the user may clearly see the image displayed on the transparent display 11 and light that enters through the window shield 22 and passes through the transparent display 11.

Meanwhile, when a clear front view is not secured due to a low transmittance of the transparent display 11 caused by the darkness around, the user may lay down the transparent display 11 as shown in FIG. 3B.

The display mode setting unit 131 may set a display mode to the second mode when an angle of the transparent display laid down by the user is less than a predetermined angle. That is, when the angle is a second angle, the display mode setting unit 131 may set a display mode as the second mode when the angle is a second angle. Here, the second angle may be an angle between the vehicle body 23 and the transparent display 11 when the transparent display is laid down as shown in FIG. 3B.

In this regard, the user may directly see light entering through the windshield 22 and an image displayed on the transparent display 11 as reflected on the windshield 22. That is, the user may secure a clear front view without obstruction of the transparent display 11 and, at the same time, may indirectly see an image displayed on the transparent display 11.

As described above, the display mode setting unit 131 may provide a desirable view for a user by recognizing an angle of the transparent display 11 that is manually adjusted by a user and setting a display mode depending on the recognized angle.

The image adjustment unit 132 of FIG. 2 may adjust an image displayed on the transparent display 11 according to a display mode of the transparent display 11 set by the display mode setting unit 131. In an exemplary implementation, the image adjustment unit 132 inverts the image displayed on the transparent display 11 when the display mode of the transparent display 11 is the second mode.

Figure 4A:
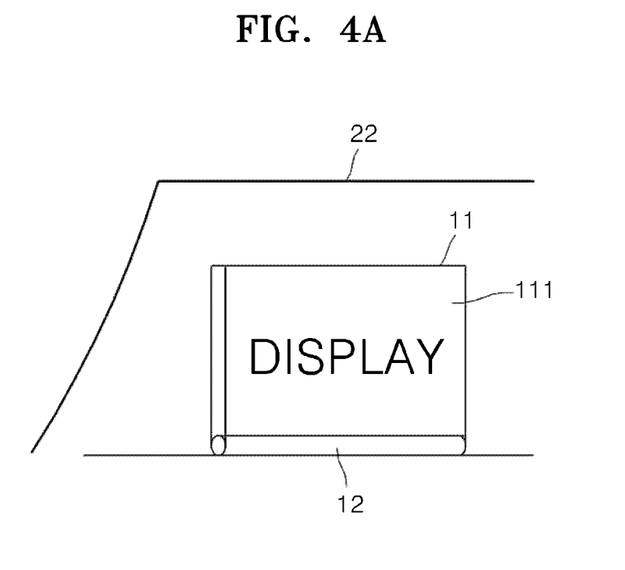
FIG. 4A is a view schematically illustrating a display system of the first mode viewed from the driver's seat.

FIG. 4A is a view schematically illustrating a display system of the first mode viewed from the driver's seat 21. Referring to FIG. 4A, a user sitting on the driver's seat 21 may see an image 111 displayed on the transparent display 11 and light that enters through the windshield 22 passing through the transparent display 11 as well.

Figure 4B:
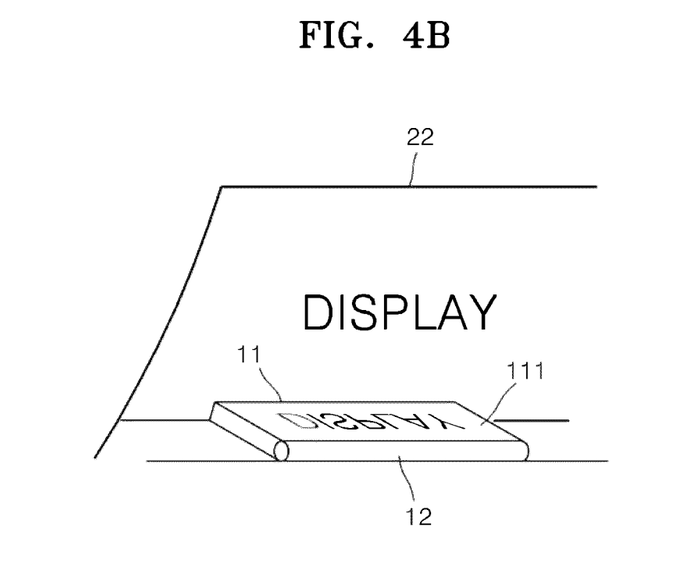
FIG. 4B is a view schematically illustrating a display system of the second mode viewed from the driver's seat.

FIG. 4B is a view schematically illustrating a display system of the second mode viewed from the driver's seat 21. Referring to FIG. 4B, a user sitting on the driver's seat 21 may see light entering through the windshield 22 and the image 111 displayed on the transparent display and reflected on the windshield as well.

Referring to FIG. 4B, the image 111 may be viewed inverted upside down to the driver's seat 21, unlike the embodiment shown in FIG. 4A, since the image 111 is reflected on the windshield 22 while the transparent display 11 is laid down.

The image adjustment unit 132 may invert the image 111 displayed on the transparent display 11 to compensate for the inversion of the image 111. The inverted image 111 is reflected on the windshield 22 and inverted again when directed toward the driver's seat 21, a driver sitting on the driver's seat 21 may see the original image 111 as shown on the windshield 22 of FIG. 4B.

As described above, a user of the display system may convert a display mode of the display system by manually controlling an angle of the transparent display 11.

According to another embodiment of the disclosed technology, the control unit 13 may control the display system according to a brightness of the ambient condition. In an exemplary implementation, the control unit 13 converts a display mode of the display system according to a brightness of the ambient condition. Alternatively, the control unit 13 may control displaying of the transparent display 11 according to a brightness of the ambient condition.

In this regard, the hinge unit 12 of FIG. 1 may include an electric motor that rotates with one side of the transparent display 11 acting as a rotation axis. The hinge controller 133 of FIG. 2 may control the electric motor of the hinge unit 12 based on a luminance measured by the sensor 14.

The hinge controller 133 may control the electric motor so that an angle from the vehicle body 23 to the transparent display 11 is the first angle when a luminance measured from the sensor 14 is equal to or greater than a standard luminance, or so that the angle is the second angle, which is smaller than the first angle, when a luminance measured from the sensor 14 is less than the standard luminance.

Here, the first angle may be an angle when the transparent display 11 is stood up, and the second angle may be an angle when the transparent display 11 is laid down. Accordingly, when the angle between the vehicle body 23 and the transparent display 11 is the first angle, an image displayed on the transparent display 11 is directed toward the driver's seat 21. However, when the angle is the second angle, the image displayed on the transparent display 11 may be directed toward the driver's seat 21 by being reflected on the windshield.

According to an embodiment of the disclosed technology, the external sensor 141 of FIG. 1 may measure a luminance outside a vehicle, and the internal sensor 142 of FIG. 1 may measure a luminance inside a vehicle. The hinge controller 133 of FIG. 2 may control the electric motor according to a result of comparing an amount of external light measured by the external sensor 141 and an amount of internal light measured by the internal sensor 142.

In an exemplary implementation, the hinge controller 133 controls the electric motor to stand the transparent display 11 up when the external light amount is greater than the internal light amount. The hinge controller 133 may control the electric motor to lay the transparent display 11 down when the external light amount is less than the internal light amount.

In an exemplary implementation, the high control unit 133 controls the electric motor to make an angle between the vehicle body 23 and the transparent display 11 be the first angle when the external light amount is greater than the internal light amount. The high control unit 133 may control the electric motor to adjust and make an angle between the vehicle body 23 and the transparent display 11 to be the second angle when the external light amount is less than the internal light amount.

According to another embodiment of the disclosed technology, the image adjustment unit 132 of FIG. 2 may control an image displayed on the transparent display 11 based on a luminance measured from the sensor 14.

The image adjustment unit 132 may control a brightness of an image based on an external light amount and an internal light amount measured from the sensor 14 to allow the image displayed on the transparent display 11 to be clearly viewed by a driver. In an exemplary implementation, the image adjustment unit 132 controls an image to provide an image of an appropriate brightness to the driver by increasing a brightness of the image when the external light amount is greater than the internal light amount. The image adjustment unit 132 may control the image to provide the image of an appropriate brightness to the driver by decreasing a brightness of the image when the external light amount is less than the internal light amount.

Figure 5:
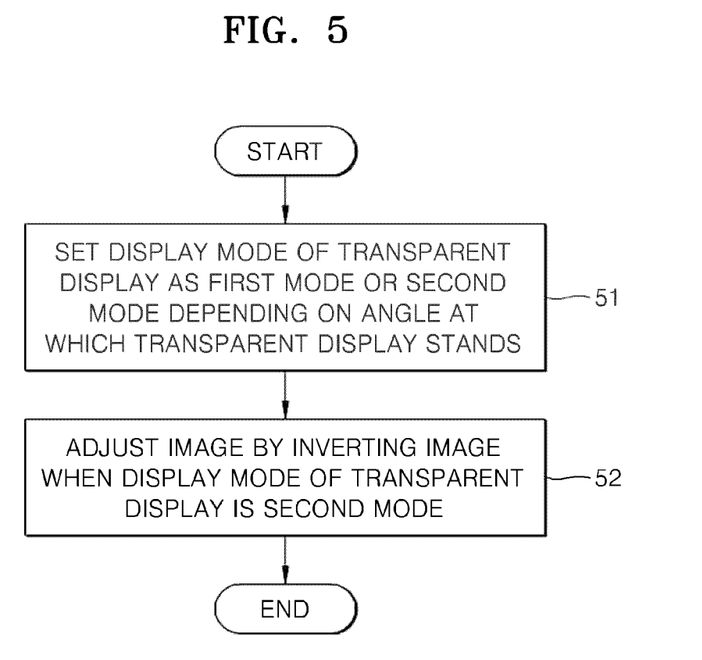
FIG. 5 is a flowchart of a display control method according to an embodiment of the disclosed technology.

FIG. 5 is a flowchart of a display control method according to an embodiment of the disclosed technology. Referring to FIG. 5, in operation 51, the display mode setting unit 131 may set the a display mode of the transparent display 11 as the first mode or the second mode depending on the angle of the transparent display 11 placed between the driver's seat 21 and the vehicle windshield 22.

The transparent display 11 may be connected to the vehicle body 23 by the hinge unit 12 supporting one side of the transparent display 11. The hinge unit 12 may include an electric motor that rotates the transparent display 11 with one side of the transparent display 11 acting as a rotation axis.

In operation 52, the image adjustment unit 132 may adjust an image displayed on the transparent display 11 to be inverted upside down when a display mode of the transparent display 11 is the second mode.

Figure 6:
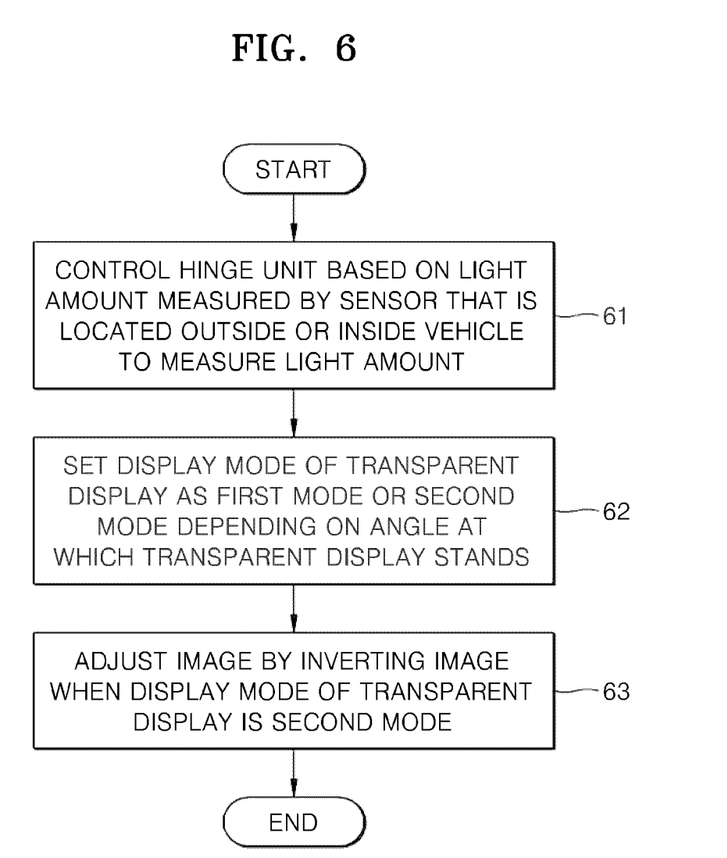
FIG. 6 is a flowchart of a display control method according to another embodiment of the disclosed technology.

FIG. 6 is a flowchart of a display control method according to another embodiment of the disclosed technology. Referring to FIG. 6, in operation 61, the hinge controller 133 may control the hinge unit 12 (or the electric motor included in the hinge unit 12) based on a luminance measured from at least one of the sensor 14 located inside or outside a vehicle. In an exemplary implementation, in operation 61, the hinge controller 133 controls the hinge unit 12 (or the electric motor included in the hinge unit 12) according to a result of comparing an external light amount and an internal light amount measured by the sensor 14.

The sensor 14 may include the external sensor 141 measuring an external light amount of a vehicle and the internal sensor 142 measuring an internal light amount of a vehicle. Accordingly, in operation 61, the hinge controller 133 may control the hinge unit 12 (or the electric motor included in the hinge unit 12) to make the angle from the vehicle body 23 to the transparent display 11 be the first angle when the external light amount is greater than the internal light amount, or make it be the second angle when the external light amount is less than the internal light amount.

In operation 62, the display mode setting unit 131 may set a display mode of the transparent display 11 interposed between the driver's seat 21 and the vehicle windshield 22 as the first mode or the second mode depending on a standing angle of the transparent display 11.

In operation 63, the image adjustment unit 132 may adjust an image displayed on the transparent display 11 to be inverted when a display mode of the transparent display 11 is the second mode.

According to one or more embodiments of the disclosed technology, the display system may implement two display modes depending on the situation, and thus an image may be safely displayed to a user in various situations. According to one or more embodiments of the disclosed technology, the display system may display an image without hindering a front view at night time when the outside is dark, by reflecting the image on the windshield 22, or may display an image on the transparent display 11 in the daytime when the outside is bright.

When a transmittance of a transparent display used as a head-up display for vehicles is high, information may be directly displayed to a user by using the transparent display regardless of a luminance in the environment. However, when a transmittance of a transparent display is limited, the display system according to one or more embodiments of the disclosed technology which provides a first mode, which directly displays an image of the transparent display, and a second mode, which indirectly displays an image by reflecting the image of the transparent display on a windshield according to a luminance in the environment, may be used.

As described above, according to an embodiment of the disclosed technology, a display system provides a display mode that is appropriate or adjustable according to various situations and different environments. As such, an image can be safely displayed on the head-up display system to a driver in the various situations or a user in the different environments. Also, according to another embodiment of the disclosed technology, visibility of a displayed image is improved since the display system may control the displayed image according to a luminance in a display environment.

For purposes of summarizing the disclosed technology, certain aspects, advantages and novel features of the disclosed technology have been described herein. It is to be understood that not necessarily all such advantages may be achieved in accordance with any particular embodiment of the disclosed technology. Thus, the disclosed technology may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the disclosed technology. Thus, the disclosed technology is not intended to be limited to the embodiments shown herein but is to be accorded the widest scope consistent with the principles and novel features disclosed herein.

While the disclosed technology described with reference to exemplary embodiments thereof, it will be understood by those of ordinary skill in the art that various changes in form and details may be made therein without departing from the spirit and scope of the disclosed technology as defined by the following claims.

What is claimed is:

1. A head-up display system for a vehicle, the display system comprising:
    a transparent display located between a driver's seat and a vehicle windshield, wherein the transparent display is mounted to a vehicle body having a surface to which the transparent display is connected;
    a display mode setting unit configured to set a display mode of the transparent display as at least one of a first mode or a second mode at least partially based on an angle formed between the transparent display and the surface of the vehicle body;
    an image adjustment unit configured to adjust an image displayed on the transparent display according to the display mode;
    at least one sensor configured to measure an amount of external light outside the vehicle and an amount of internal light inside the vehicle; and
    a hinge controller configured to control the angle to operate the transparent display in one of the first mode at a first angle or the second mode at a second angle at least partially based on the amount of external light and the amount of internal light,
    wherein the image adjustment unit is configured to increase a brightness of the image displayed on the transparent display when the amount of external light is greater than the amount of internal light, wherein the image adjustment unit is configured to decrease the brightness of the image displayed on the transparent display when the amount of external light is less than the amount of internal light, and wherein the second angle is different from the first angle.

2. The head-up display system of claim 1, wherein the image adjustment unit inverts the image when the display mode is the second mode.

3. The head-up display system of claim 1, wherein the display mode setting unit sets the display mode as the first mode when the angle is greater than or equal to a first predetermined angle, and wherein the display mode setting unit sets the display mode as the second mode when the angle is less than a second predetermined angle between the surface of the vehicle body and the second mode of the transparent display.

4. The head-up display system of claim 1, further comprising a hinge unit connected to the vehicle body and supporting at least one side of the transparent display.

5. The head-up display system of claim 4, wherein the hinge unit comprises an electric motor configured to rotate the transparent display using the at least one side of the transparent display as a rotation axis.

6. The head-up display system of claim 5, wherein the at least one sensor is located inside or outside of the vehicle and wherein the hinge controller is further configured to control the electric motor at least partially based on the measured amount of external or internal light.

7. The head-up display system of claim 6, wherein the hinge controller controls the electric motor to adjust the angle between the surface of the vehicle body and the transparent display to be the first angle when the amount of external or internal light is equal to or greater than a predetermined value, wherein the hinge controller controls the electric motor to adjust the angle to be the second angle when the amount of external or internal light is less than the predetermined value.

8. The head-up display system of claim 7, wherein the second angle is less than the first angle.

9. The head-up display system of claim 7, wherein the display mode setting unit sets the display mode as the first mode when the angle is the first angle, and wherein the display mode setting unit sets the display mode as the second mode when the angle is the second angle.

10. The head-up display system of claim 6, wherein the at least one sensor comprises an external sensor that measures the amount of external light outside the vehicle and an internal sensor that measures the amount of internal light inside the vehicle, and wherein the hinge controller controls the electric motor at least partially based on the amount of external light and the amount of internal light.

11. The head-up display system of claim 10, wherein the hinge controller controls the angle between the vehicle body and the transparent display to be the first angle when the amount of external light is greater than the amount of internal light, wherein the hinge controller controls the angle to be the second angle when the amount of external light is less than the amount of internal light, and wherein the second angle is different than the first angle.

12. The head-up display system of claim 11, wherein the second angle is less than the first angle.

13. The head-up display system of claim 4, wherein the transparent display is detachable from the hinge unit.

14. The head-up display system of claim 1, wherein the image displayed on the transparent display is directed toward the driver's seat when the display mode is the first mode, and wherein the image is directed toward the driver's seat as a reflection on the windshield when the display mode is the second mode.

15. The head-up display system of claim 1, wherein the transparent display is an organic electroluminescence display.

16. The head-up display system of claim 1, further comprising a reflection plate located on the vehicle windshield, the reflection plate being configured to reflect the image displayed on the transparent display.

17. An apparatus for controlling a head-up display of a vehicle, the apparatus comprising:
- a display mode setting unit configured to set a display mode of a transparent display, to be a first mode or a second mode at least partially based on an angle between the transparent display and a surface of a vehicle body, wherein the transparent display is connected the surface of the vehicle body, wherein the transparent display is located between a driver's seat and a vehicle windshield and is connected to the vehicle body via a hinge unit;
- an image adjustment unit configured to invert an image displayed on the transparent display when the display mode is the second mode;
- at least one sensor configured to measure an amount of external light outside the vehicle and an amount of internal light inside the vehicle; and
- a hinge controller configured to control the angle to operate in one of the first mode at a first angle or the second mode at a second angle at least partially based on the amount of external light and the amount of internal light,
- wherein the image adjustment unit is configured to increase a brightness of the image displayed on the transparent display when the amount of external light is greater than the amount of internal light, wherein the image adjustment unit is configured to decrease the brightness of the image displayed on the transparent display when the amount of external light is less than the amount of internal light, and wherein the second angle is different from the first angle.

18. The apparatus of claim 17, wherein the hinge unit further comprises:
- an electric motor configured to rotate the transparent display with one side of the transparent display as a rotation axis, and
- a hinge controller configured to control the electric motor at least partially based on the amount of external or internal light.

19. The apparatus of claim 18, wherein the at least one sensor comprises an external sensor configured to measure the amount of external light and an internal sensor configured to measure the amount of internal light, and wherein the hinge controller is configured to control the electric motor at least partially based on the amount of external light and the amount of internal light.

20. The apparatus of claim 19, wherein the hinge controller is further configured to control the angle between the vehicle body and the transparent display to be the first angle when the amount of external light is greater than the amount of internal light, wherein the hinge controller is further configured to control the angle to be the second angle when the amount of external light is less than the amount of internal light.

21. The apparatus of claim 17, wherein the image displayed on the transparent display is directed toward the driver's seat when the display mode is the first mode, and wherein the image is directed toward the driver's seat as a reflection on the windshield when the display mode is the second mode.

22. A method of controlling a head-up display of a vehicle, the method comprising:
- setting a display mode of a transparent display positioned between a driver's seat and a vehicle windshield as a first mode or a second mode at least partially based on an angle between the transparent display and a surface of a vehicle body, wherein the transparent display is mounted on the surface of the vehicle body;
- adjusting an image displayed on the transparent display;
- measure an amount of external light outside the vehicle and an amount of internal light inside the vehicle; and
- control the angle to operate the transparent display in one of the first mode at a first angle or the second mode at a second angle at least partially based on the amount of external light and the amount of internal light,
- wherein the transparent display is connected to the vehicle body by a hinge unit that supports one side of the transparent display,
- wherein the adjusting the image comprises increasing a brightness of the image displayed on the transparent display when the amount of external light is greater than the amount of internal light, and decreasing the brightness of the image displayed on the transparent display when the amount of external light is less than the amount of internal light, and wherein the second angle is different from the first angle.

23. The method of claim 22, wherein adjusting the image comprises inverting the image when the display mode of the transparent display is the second mode.

24. The method of claim 22, further comprising controlling an electric motor of the hinge unit at least partially based on the amount of external or internal light measured by at least one sensor located inside or outside the vehicle, wherein the electric motor is configured to rotate the transparent display with one side of the transparent display as a rotation axis.

25. The method of claim 24, wherein controlling of the electric motor comprises controlling the electric motor at least partially based on the amount of external light and the amount of internal light, and wherein the at least one sensor comprises an external sensor that measures the amount of external light outside the vehicle and an internal sensor that measures the amount of internal light inside the vehicle.

26. The method of claim 25, wherein controlling the electric motor comprises controlling the electric motor so that the angle between the surface of the vehicle body and the transparent display is the first angle when the amount of external light is greater than the amount of internal light and so that the angle is the second angle when the amount of external light is less than the amount of internal light, and wherein the second angle is less than the first angle.

* * * * *